Patented May 18, 1954

2,678,925

UNITED STATES PATENT OFFICE 2,678,925

PRESSURE POLYMERIZED COPOLYMERS OF ACRYLONITRILE AND UNSATURATED CARBOXYLIC ESTERS

Hugh J. Hagemeyer, Jr., Kingsport, and Ralph E. De Busk, Bristol, Tenn., assignors to Eastman Kodak Company, Rochester, N. Y., a corporation of New Jersey No Drawing. Application May 9, 1951,
Serial No. 225,456

8 Claims. (Cl. 260—85.5)

This invention relates to resinous copolymers of acrylonitrile with unsaturated carboxylic esters, which are characterized by having a high degree of affinity for cellulose acetate dyes, and relates more particularly to a novel process for their preparation.

It is known that acrylonitrile can be copolymerized with various unsaturated carboxylic esters such as with vinyl acetate, isopropenyl acetate, isobutenyl acetate, etc. to give resinous copolymers useful in preparing films, fibers, molded articles, and the like. The limitations on such copolymers are many, however, and their use has been somewhat restricted. For example, the dye affinities of the acrylonitrile-isopropenyl acetate copolymer described in U. S. Patent 2,514,624, issued July 11, 1950, to John R. Caldwell, and the acrylonitrile-isobutenyl acetate copolymer described in U. S. Patent 2,521,898, issued September 12, 1950, to John R. Caldwell, are greater than the dye affinity of homopolymers of acrylonitrile, but still inferior to partially hydrolyzed yarn type cellulose acetates. Hardly more than tints are obtainable with such resinous copolymers with cellulose acetate dyes. Also the melting points of such prior art copolymers are in the relatively low and less than desirable range of from 100° to 190° C.

We have now found that by carrying out the copolymerization of acrylonitrile with certain vinyl esters and more particularly with certain isoalkenyl esters, wherein the ester group in each case is the radical of a saturated fatty acid containing from 1 to 4 carbon atoms (e. g. vinyl formate, vinyl acetate, vinyl propionate, vinyl butyrate, isopropenyl acetate, isopropenyl propionate, isopropenyl butyrate, isobutenyl acetate, etc.), in the presence of polymerization catalysts under substantially higher pressures that the resinous copolymers obtained have new and unexpected properties. In contrast to copolymers prepared at or near atmospheric pressure, the elevated pressure polymerized copolymers of the invention have melting points above 300° C., show increased moisture absorption and marked affinity for cellulose acetate dyes. Another feature is that fibers prepared from the elevated pressure polymerized copolymers have greatly reduced shrinkage in hot water. These desirable properties are believed to derive in part from the fact that some hydrolysis occurs under the increased pressure conditions of the polymerizations. The enhanced affinity for acetate dyes is attributed to the presence of free hydroxyl groups. In addition to partial hydrolysis of the ester groups, some hydrolysis of nitrile groups to amide groups has also been observed. Accordingly, the process of the invention gives resinous copolymers consisting of major proportions of acrylonitrile units and isoalkenyl carboxylic ester units, and minor proportions of unsaturated alcohol units and acrylamide units.

It is, accordingly, an object of the invention to provide new resinous copolymers of acrylonitrile. Another object is to provide a novel process for preparing such resinous copolymers of acrylonitrile which possess superior properties, especially for the spinning of fibers. Other objects will become apparent hereinafter.

In accordance with our invention, we polymerize a mixture containing from 80 to 90 parts dry weight of acrylonitrile and from 20 to 10 parts by weight of the desired unsaturated carboxylic ester, at a temperature of from 20° to 200° C., but preferably from 30° to 90° C., and at a critical pressure range of from 20 to 400 atmospheres, in the presence of a polymerization catalyst. Advantageously, an inert diluent can be employed. The copolymers obtained appear, in general, to have a composition corresponding approximately to that of the monomeric mixtures prior to polymerization. They are soluble in one or more volatile organic solvents such as dimethyl formamide, N-methyl pyrrolidone, gamma-pyrone, gamma-butyrolactone, dimethyl acetamide, ethylene carbonate and ethylene carbamate. The polymerizations can be carried out in mass or dispersed in a non-solvent for the monomers, the particles of dispersed monomers being very small (emulsion) or relatively large (bead or granular). For emulsion polymerization, any non-solvent for the monomers can be employed, water being especially advantageous. The mixture of monomers can be advantageously emulsified in the water using emulsifying agents such as salts of fatty alcohol sulfates (e. g. sodium lauryl sulfate, sodium or potassium stearyl sulfate, etc.), alkali metal salts of aromatic sulfonic acids (e. g. sodium or potassium salts of alkylnaphthalene sulfonic acids, etc.), sulfosuccinic acid esters, their alkali metal salts, and the like. In general, any of the known emulsifying agents can be employed. For bead or granular polymerizations, relatively poor dispersing agents such as starch, methylated starch, gum arabic, polyvinyl alcohol, partially hydrolyzed polyvinyl acetate, gelatin, sodium glycolate, etc., can be employed. Mixtures of dispersing agents can be used. In the polymerizations wherein the monomers are dispersed in non-solvents, the polymerization can be facilitated by stirring, shaking or tumbling the mixtures during the reaction.

The process of the invention is promoted by the presence of polymerization catalyst which are known to accelerate polymerizations such as, for example, peroxide type catalysts represented by benzoyl peroxide, acetyl peroxide, hydrogen peroxide, ammonium and alkali metal persulfates, etc. However, the preferred catalysts for the process of the invention are of the oxidation-reduction type. Materials which are suitable for the oxidation portion of the catalyst include ammonium and alkali salts of perdisulfuric acid and perboric acid, hydrogen peroxide, peracetic acid, urea-peroxide, diacetyl peroxide, etc. Ammonium and potassium persulfates are particularly efficient, ammonium persulfate being preferable because of the lower pH of the catalyst solution (pH of 2 to 5) which range of hydrogen ion concentration appears to promote the polymerization of copolymers of acrylonitrile. The concentration of the oxidation portion of the catalyst can be varied within wide limits, but usually within 0.1 to 1 per cent by weight of the monomers. The intrinsic viscosity of the polymer decreases with increasing concentrations. The reduction or activator portion of the catalyst includes compounds such as sodium bisulfite, sulfur dioxide, sodium hydrosulfite, sodium thiosulfate, diethyl sulfite, sulfinic acid, etc. In general, the quantity of activator employed can vary from 0.1 to 5 molar proportion based on the oxidation portion of the catalyst. For example, in a preferred recipe for 100 g. of monomers containing 80 g. of acrylonitrile, 0.5 g. of ammonium persulfate and 1.0 g. of sodium bisulfite or a molar ratio of 1:4 is employed. Mixtures of the mentioned oxidation compounds and mixtures of the mentioned reduction or activator compounds can be employed. In addition to the oxidation-reduction portions of the catalyst, the catalyst can also advantageously contain modifiers such as hexyl, octyl, lauryl, dodecyl or myristyl mercaptans etc. which regulate the molecular weight of the resulting copolymers independently of the catalyst concentration and polymerization temperature employed. Such modifiers can be used in amounts usually less than 1 per cent of the monomers employed.

The following examples will serve to illustrate further the manner whereby we practice the process of our invention.

*Example 1.*—A 3-liter stainless steel, stirrer autoclave was charged with 400 g. of acrylonitrile, 100 g. of isopropenyl acetate, 25 cc. of the sodium sulfate derivative of 7-ethyl-2-methylundecanol-4, 10 g. of a viscous, light-colored oil dispersible in water and having a specific gravity of 0.92 at 100° F., 1.5 g. of potassium persulfate, 0.5 g. of tert. dodecyl mercaptan and 1800 cc. of deionized water. The autoclave was pressured with nitrogen and the polymerization carried out, with stirring, at from 52° to 70° C. and at a pressure of 3200–3500 pounds per square inch. The polymerization was stopped at 62% conversion, the emulsion coagulated in 2% aqueous sodium chloride solution, the resinous precipitate filtered out, washed with water, then with methanol and dried. The analysis of the copolymer product gave 21.3% by weight of nitrogen, 3.1% by weight of acetyl and 5.2% hydroxyl which corresponds to a mole ratio of acrylonitrile to isopropenyl alcohol to isopropenyl acetate of 4.73 to 0.37 to 0.38. The copolymer was dissolved in dimethyl formamide from which solution were spun fibers with a tensile strength of 2.89 grams per denier and an elongation of 40.9%. The fibers showed unusually good affinity for cellulose acetate dyes and were distinct from the acrylonitrile-isopropenyl acetate copolymers prepared by ordinary methods in that they were both wash and gas fast.

In place of the isopropenyl acetate in the above example, there can be substituted an equivalent amount of isopropenyl propionate or of isobutenyl acetate to give corresponding copolymers of acrylonitrile-isopropenyl propionate and acrylonitrile-isobutenyl acetate which on spinning from their solutions in the mentioned organic solvents also showed unusually good dye affinities for cellulose acetate dyes and had similarly good physical properties.

*Example 2.*—A 3-liter stainless steel, stirrer autoclave was charged with 400 g. of acrylonitrile, 100 g. of isopropenyl acetate, 25 cc. of the sodium sulfate derivative of 7-ethyl-2-methylundecanol-4, 10 g. of a viscous, light-colored oil dispersible in water and having a specific gravity of 0.92 at 100° F., 1.5 g. of potassium persulfate, 0.5 g. of tert. dodecyl mercaptan and 1800 cc. of 1% aqueous phosphoric acid. The autoclave was pressured with nitrogen and the polymerization carried out, with stirring, at from 50° to 90° C. and a pressure of 2800–3900 p. s. i. The polymerization was stopped at 53% conversion. The emulsion was coagulated with 2% aqueous sodium chloride, the resinous precipitate filtered out, washed with water, then with methanol and dried. The analysis of the copolymer product gave 22% of nitrogen corresponding to 83% by weight of acrylonitrile, 6.66% hydroxyl, and 1.8% acetyl which corresponds to a mole ratio of acrylonitrile to isopropenyl alcohol to isopropenyl acetate of 3.73 to 1.08 to 0.10. Fibers spun from a solution of the copolymer in dimethyl acetamide had a tensile strength of 3.45 grams per denier and gave an elongation of 33.7%. The fibers showed an unusually good dye affinity for cellulose acetate dyes and a fair direct dye affinity which is indicative of the almost complete hydrolysis of the isopropenyl acetate in the final copolymer composition.

*Example 3.*—A 3-liter stainless steel, stirrer autoclave was charged with 270 g. of acrylonitrile, 30 g. of isopropenyl acetate, 2.25 g. of ammonium persulfate, 4.5 g. of sodium bisulfite, 2.25 g. of tert. dodecyl mercaptan and 1500 cc. of water. The autoclave was pressured with nitrogen and the polymerization carried out at 80° to 93° C. and with a pressure of from 2100–2925 p. s. i. An 82% conversion was obtained in 3 hours. The copolymer obtained on analysis gave 24.3% by weight of nitrogen, and 2.51% by weight of hydroxyl which corresponds to a polymer composition containing 92% by weight of acrylonitrile units, the remainder being substantially all isopropenyl alcohol units. Fibers spun from a solution of the copolymer in gamma-butyrolactone had a tensile strength of 4.26 grams per denier and gave an elongation of 27%. Cloth woven from a 40 filament, 222 denier fiber showed an unusually good affinity for cellulose acetate dyes.

*Example 4.*—A mixture of 270 g. of acrylonitrile, 30 g. of vinyl acetate, 2.25 g. of ammonium persulfate, 4.5 g. of sodium bisulfite, 2.25 g. of tert. dodecyl mercaptan and 1500 cc. of water was polymerized in a 3-liter stainless steel autoclave, equipped with a stirrer, at from 72° to 91° C. and under nitrogen pressure of from 2100–3175 p. s. i. A 93% conversion was obtained in 3 hours. The copolymer on analysis gave 23.4% by weight of nitrogen, 2.8% by weight hydroxyl and 0.02% acetyl. This analysis would indicate a polymer composition containing 21 grams of vinyl alcohol and by difference 39.8 grams of acrylamide and 218.2 grams of acrylonitrile. Approximately 16% hydrolysis of the nitrile group to amide occurred during the polymerization period. Fibers spun from a solution of the copolymer in dimethyl formamide had a tensile strength of 4.12 grams per denier and gave an elongation of 25%. The fibers showed good affinity for cellulose acetate dyes.

*Example 5.*—A mixture of 255 g. of acrylonitrile, 45 g. of vinyl acetate, 2.25 g. of ammonium persulfate, 4.5 g. of sodium bisulfite, 2.25 g. of tert. dodecyl mercaptan and 1500 cc. of water was polymerized in a 3-liter stainless steel autoclave, equipped with a stirrer, at a temperature of from 70° to 78° C. and under a nitrogen pressure of from 2600–3350 p. s. i. A 96% conversion was obtained. The copolymer on analysis gave a nitrogen content of 22.6% by weight, 4.42% hydroxyl and 0.18% acetyl. Here again in addition to the almost complete hydrolysis of the vinyl acetate to vinyl alcohol in the final polymer composition, a substantial degree of hydrolysis of nitrile group to amide also took place. Fibers spun from a solution of the copolymer in dimethyl formamide had a tensile strength of 5.4 grams per denier and gave an elongation of 33%. The fibers showed good affinity for cellulose acetate dyes.

In place of the vinyl acetate in the above Examples 4 and 5, there can be substituted an equivalent amount of vinyl formate or of vinyl butyrate to give corresponding copolymers of acrylonitrile-vinyl formate and acrylonitrile-vinyl formate and acrylonitrile-vinyl butyrate which on spinning from their solutions in the mentioned organic solvents also showed good dye affinities for cellulose acetate dyes and had similarly good physical properties.

What we claim is:

1. A process for preparing copolymers of acrylonitrile and an unsaturated ester, said copolymers containing from 2.5 to 6.7 per cent by weight of free hydroxyl groups, comprising reacting a mixture of from 80 to 90 parts by weight of acrylonitrile and from 20 to 10 parts by weight of an unsaturated ester selected from the group consisting of a vinyl ester of a saturated fatty acid containing from 1 to 4 carbon atoms, an isopropenyl ester of a saturated fatty acid containing from 1 to 4 carbon atoms and an isobutenyl ester of a saturated fatty acid containing from 1 to 4 carbon atoms, at a temperature of from 20° to 200° C. and a pressure of from 20 to 400 atmospheres, in the presence of a peroxide polymerization catalyst.

2. A process for preparing copolymers of acrylonitrile and an isopropenyl ester of a saturated fatty acid containing from 1 to 4 carbon atoms, said copolymers containing from 2.5 to 6.7 per cent by weight of free hydroxyl groups, comprising reacting a mixture of from 80 to 90 parts by weight of acrylonitrile and from 20 to 10 parts by weight of the said isopropenyl ester, at a temperature of from 30° to 90° C. and a pressure of from 20 to 400 atmospheres, in the presence of a peroxide polymerization catalyst.

3. A process for preparing a copolymer of acrylonitrile and isopropenyl acetate, said copolymer containing from 2.5 to 6.7 per cent by weight of free hydroxyl group, comprising reacting a mixture containing 400 g. of acrylonitrile and 100 g. of isopropenyl acetate, at a temperature of from 50° to 90° C. and a pressure of from 2800 to 3900 pounds per square inch, in the presence of potassium persulfate.

4. A process for preparing a copolymer of acrylonitrile and isopropenyl acetate, said copolymer containing from 2.5 to 6.7 per cent by weight of free hydroxyl groups, comprising reacting a mixture containing 270 g. of acrylonitrile and 30 g. of isopropenyl acetate, at a temperature of from 80° to 93° C. and a pressure of from 2100 to 2925 pounds per square inch, in the presence of a polymerization catalyst consisting of ammonium persulfate and sodium bisulfite.

5. A process for preparing a copolymer of acrylonitrile and vinyl acetate, said copolymer containing from 2.5 to 6.7 per cent by weight of free hydroxyl groups, comprising reacting a mixture containing 270 g. of acrylonitrile and 30 g. of vinyl acetate, at a temperature of from 70° to 78° C. and a pressure of from 2600 to 3350 pounds per square inch, in the presence of a polymerization catalyst consisting of ammonium persulfate and sodium bisulfite.

6. The copolymers prepared according to the process of claim 2.

7. The copolymer prepared according to the process of claim 3.

8. The copolymer prepared according to the process of claim 4.

References Cited in the file of this patent

UNITED STATES PATENTS

| Number | Name | Date |
|---|---|---|
| 2,117,321 | Hill | May 17, 1938 |
| 2,496,275 | Dickey | Feb. 7, 1950 |